(12) United States Patent
Cho

(10) Patent No.: US 8,411,153 B2
(45) Date of Patent: Apr. 2, 2013

(54) CAMERA UNIT AND MULTIMEDIA INFORMATION APPLIANCE INCLUDING CAMERA UNIT

(75) Inventor: Hyunduk Cho, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 135 days.

(21) Appl. No.: 12/768,862

(22) Filed: Apr. 28, 2010

(65) Prior Publication Data

US 2010/0302388 A1 Dec. 2, 2010

(30) Foreign Application Priority Data

May 29, 2009 (KR) .................. 10-2009-0047513

(51) Int. Cl.
*H04N 5/228* (2006.01)
(52) U.S. Cl. .................. 348/208.12; 348/222.1
(58) Field of Classification Search .............. 348/222.1, 348/231.1–231.9, 229.1, 345–357
See application file for complete search history.

(56) References Cited

U.S. PATENT DOCUMENTS

| | | | |
|---|---|---|---|
| 6,895,256 B2 | 5/2005 | Harma et al. | |
| 7,280,705 B1 * | 10/2007 | Frank et al. | 382/274 |
| 2002/0071037 A1 | 6/2002 | Haavisto | |
| 2004/0239790 A1 * | 12/2004 | Maeda et al. | 348/311 |
| 2005/0219399 A1 * | 10/2005 | Sato et al. | 348/340 |
| 2006/0007321 A1 | 1/2006 | Huai | |
| 2006/0146152 A1 | 7/2006 | Jo et al. | |
| 2006/0192859 A1 * | 8/2006 | Sasaki | 348/222.1 |
| 2006/0192860 A1 * | 8/2006 | Atsumi et al. | 348/222.1 |
| 2006/0221230 A1 | 10/2006 | Dutta et al. | |
| 2008/0012943 A1 * | 1/2008 | Watanabe et al. | 348/207.1 |
| 2008/0074536 A1 * | 3/2008 | Tamura | 348/371 |
| 2008/0133800 A1 * | 6/2008 | Gloekler et al. | 710/61 |
| 2008/0180540 A1 * | 7/2008 | Kim et al. | 348/222.1 |
| 2008/0204565 A1 * | 8/2008 | Yumiki | 348/208.99 |
| 2008/0291300 A1 * | 11/2008 | Hitomi et al. | 348/241 |
| 2010/0113095 A1 * | 5/2010 | Carmon et al. | 455/561 |

FOREIGN PATENT DOCUMENTS

| | | |
|---|---|---|
| EP | 1215894 A2 | 6/2002 |
| JP | 2003189262 | 4/2003 |
| JP | 2006191622 | 7/2006 |
| KR | 1020060078139 A | 7/2006 |
| KR | 1020070003420 A | 1/2007 |
| KR | 1020070047729 A | 5/2007 |
| WO | 0247385 A1 | 6/2002 |
| WO | 2004093438 A1 | 10/2004 |

\* cited by examiner

*Primary Examiner* — Tuan Ho
*Assistant Examiner* — Christopher K Peterson
(74) *Attorney, Agent, or Firm* — Volentine & Whitt, PLLC

(57) ABSTRACT

A camera unit includes an image sensor, an image signal processor, an application processor and a frame memory. The image sensor receives an optical signal from a lens unit and converts it into an electrical signal. The image signal processor converts the electrical signal into an image signal, and includes a first sub block controlling the image sensor and the lens unit and a second sub block receiving and processing the image signal from the first sub block. The application processor receives the image signal from the second sub block and further processes the image signal. The frame memory is connected to the second sub block and the application processor to store the processed image signal. The image sensor and the first sub block constitute a first chip not connected to the frame memory, and the second sub block and the application processor constitute a second chip connected to the frame memory.

9 Claims, 3 Drawing Sheets or, an image signal processor, an application processor, a frame memory and an image display.

The image sensor receives an optical signal from a lens unit and converts the optical signal into an electrical signal. The image signal processor converts the electrical signal into an image signal, and includes a first sub block controlling the image sensor and the lens unit, and a second sub block receiving the image signal from the first sub block and performing first processing of the image signal. The application processor receives the processed image signal from the second sub block and performs second processing of the processed image signal. The frame memory is connected to the second sub block and the application processor to store the image signal processed by at least one of the second sub block and the application processor. The image display receives the processed image signal from the application processor and displays an image corresponding to the received image signal. The image sensor and the first sub block constitute a sensor chip not connected to the frame memory, and the second sub block and the application processor constitute a processor chip connected to the frame memory.

CAMERA UNIT AND MULTIMEDIA INFORMATION APPLIANCE INCLUDING CAMERA UNIT

PRIORITY STATEMENT

A claim of priority is made under 35 U.S.C. §119 to Korean Patent Application No. 10-2009-0047513, filed on May 29, 2009, in the Korean Intellectual Property Office, the subject matter of which is hereby incorporated by reference.

BACKGROUND

The present disclosure relates to a camera unit and a multimedia information appliance including the camera unit. More particularly, the present disclosure relates to a camera unit capable of reducing the number of memories and improving image quality, and a multimedia information appliance including the camera unit.

As additional applications and capabilities are developed for mobile communication devices, secondary functions unrelated to wireless communications, such as camera modules or units, multimedia players, and the like, are being added to mobile communication devices. Further, the scope of functionality of the camera units has broadened through improvement of display screens of the mobile communication device, as well as implementation of high-speed communication. That is, the supply of mobile communication devices equipped with camera units is steadily increasing, and the performance of the camera units (e.g., pixel density, etc.) mounted in the mobile communication units is improving.

A typical camera unit includes an image sensor, an Image Signal Processor (ISP), and an application processor. Generally, the image sensor converts optical signals received from a lens unit into electrical signals, and outputs the electrical signals. The ISP converts the electrical signals output from the image sensor into image signals, and the application processor processes the image signals received from the ISP.

SUMMARY

The present disclosure generally describes a camera unit for reducing the total number of memories and improving image quality. Also, the present disclosure describes a multimedia information appliance that includes the camera unit.

Embodiments of the inventive concept provide a camera unit, including an image sensor, an image signal processor, an application processor and a frame memory.

The image sensor receives an optical signal from a lens unit and converts the optical signal into an electrical signal. The image signal processor converts the electrical signal into an image signal, and includes a first sub block controlling the image sensor and the lens unit, and a second sub block receiving the image signal from the first sub block and processing the image signal. The application processor receives the image signal from the second sub block and further processes the image signal. The frame memory is connected to the second sub block and the application processor to store the processed image signal from at least one of the second sub block and the application processor. The image sensor and the first sub block constitute a first chip not connected to the frame memory, and the second sub block and the application processor constitute a second chip connected to the frame memory.

Other embodiments of the inventive concept provide a multimedia information appliance, including an image sen-

BRIEF DESCRIPTION OF THE DRAWINGS

The accompanying drawings are included to provide a further understanding of the inventive concept, and are incorporated in and constitute a part of this specification. Exemplary embodiments of the inventive concept will be described with reference to the attached drawings, in which.

DETAILED DESCRIPTION OF THE EMBODIMENTS

Figure 1:
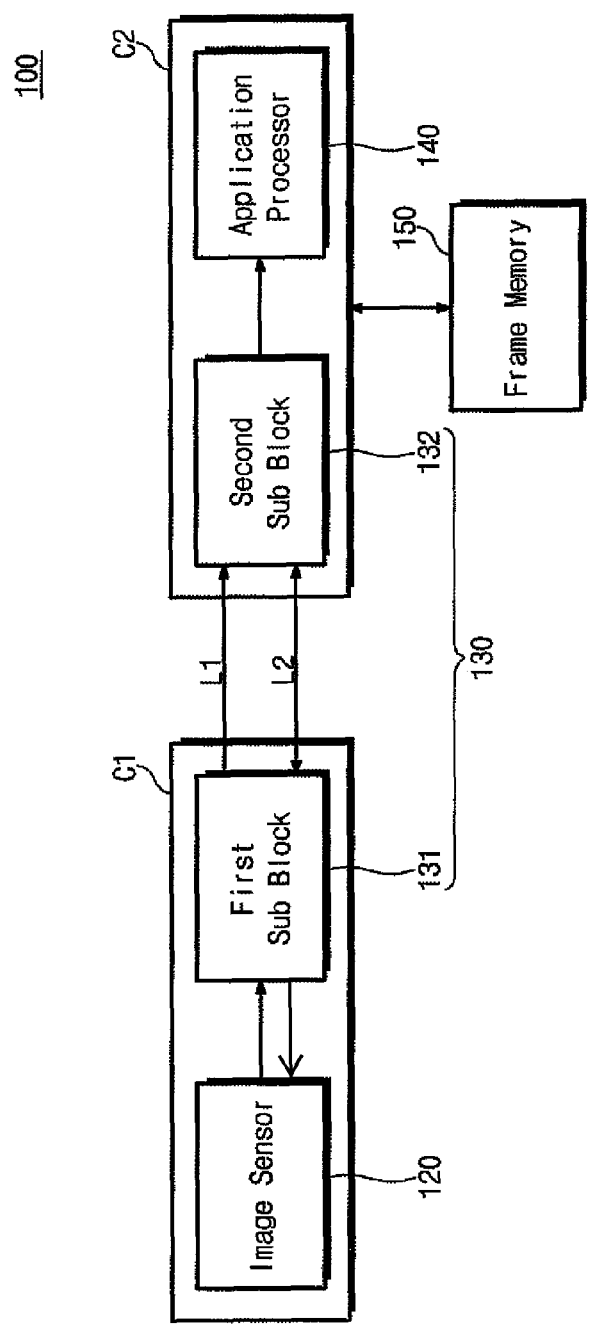
FIG. 1 is a block diagram illustrating a camera unit, according to an exemplary embodiment of the inventive concept.

Various embodiments of the inventive concept will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments. Throughout the drawings and written description, like reference numerals will be used to refer to like or similar elements.

FIG. 1 is a block diagram illustrating a camera unit, according to an exemplary embodiment of the inventive concept.

Referring to FIG. 1, a camera unit 100 includes an image sensor 120, an Image Signal Processor (ISP) 130, an application processor 140, and a frame memory 150.

The image sensor 120 is configured to receive optical signals from a lens unit (not shown) corresponding to images, and to convert the optical signals into electrical signals. The electrical signals generated from the image sensor 120 are transmitted to the ISP 130.

The ISP 130 is configured to convert the electrical signals output from the image sensor 120 into image signals. For example, the ISP 130 may convert the electrical signals output from the image sensor 120 into digital image signals, and output the digital image signals. Also, the ISP 130 may control operations of the image sensor 120 and the lens unit.

The application processor 140 is configured to perform various processing functions in order to display the image signals. In addition, the application processor 140 may compress and decompress the image signals supplied from the ISP 130.

FIG. 1 depicts an embodiment of the inventive concept in which the ISP 130 includes a first sub block 131 and a second sub block 132, for example. The first sub block 131 includes function blocks for controlling the image sensor 120 and the lens unit, and therefore the first sub block 131 does not require use of the frame memory 150. In comparison, the second sub block 132 includes function blocks for processing the image signals, and therefore the second sub block 132 may require the frame memory 150 to store the processed image signals.

As shown in FIG. 1, the image sensor 120 and the first sub block 131 constitute a sensor chip C1, and the application processor 140 and the second sub block 132 constitute a processor chip C2, for example. The frame memory 150 is connected to the processor chip C2, which includes the second sub block 132 and the application processor 140. Therefore, the second sub block 132 and the application processor 140 may store signals in the frame memory 150, or may read out stored signals from the frame memory 150. The frame memory 150 is not connected to the sensor chip C1.

Since the first sub block 131 is directly connected to the image sensor 120, the first sub block 131 may easily tune parameter values of the ISP 130 in consideration of the characteristics of the image sensor 120 and the lens unit. Meanwhile, the second sub block 132 is provided in the processor chip C2 to use the frame memory 150, while being connected to the image sensor 120 through the first sub block 131. Accordingly, since the frame memory 150 is connected to only the processor chip C2, but no frame memory is connected to the sensor chip C1, the total number of frame memories provided in the camera unit 100 is reduced.

A data line L1 and a control line L2 may be provided as interfaces between the first sub block 131 and the second sub block 132. The data line L1 transmits the image signals output from the first sub block 131 to the second sub block 132. The control line L2 transmits processing results of one or more function blocks of the first sub block 131 to corresponding function blocks of the second sub block 132, and transmits processing results of one or more function blocks of the second sub block 132 to corresponding function blocks of the first sub block 131. For example, the control line L2 may include high speed-serial peripheral interface (HS-SPI), which has a small number of lines and transmits signals at a relatively high speed, although other implementations of the control line L2 may be included without departing from the scope of the present teachings.

Figure 2:
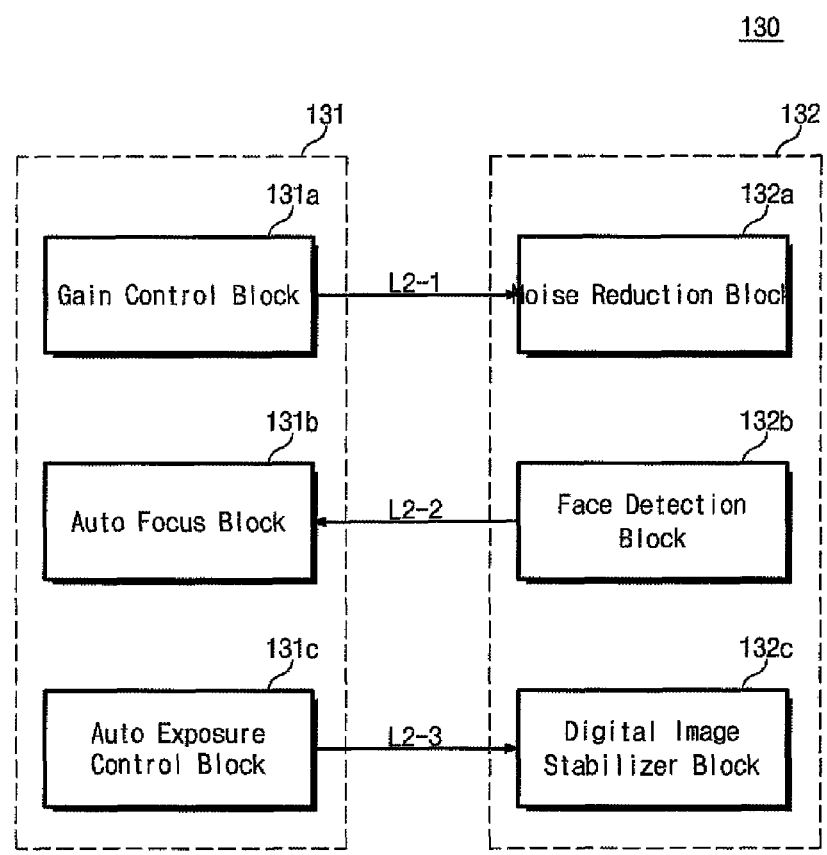
FIG. 2 is a block diagram illustrating a first sub block and a second sub block of FIG. 1, according to an exemplary embodiment of the inventive concept.

FIG. 2 is a block diagram illustrating the first sub block and the second sub block of FIG. 1, according to an exemplary embodiment.

Referring to FIG. 2, the first sub block 131 includes a gain control block 131a, an auto focus block 131b, and an auto exposure control block 131c. The gain control block 131a adjusts signal strength of signals output from the image sensor 120. The auto focus block 131b automatically adjusts focus of the lens unit. The auto exposure control block 131c adjusts an exposure time of the image sensor 120 to adjust automatically a brightness of the image sensor 120 automatically.

The second sub block 132 includes a noise reduction block 132a, a face detection block 132b, and a digital image stabilizer block 132c. The noise reduction block 132a removes noise using one or more frames of image signals. For example, in an embodiment of the inventive concept, the noise reduction block 132a may include a 3D noise reduction block that removes the noise using multiple frames of image signals. The face detection block 132b detects a human face of the subject, when appropriate, from an image. The digital image stabilizer block 132c performs a function of inhibiting the effects of hand tremor of the camera unit operator or other undesirable shaky movement.

The first and second sub blocks 131 and 132 may exchange data through the control line L2. For example, when International Standards Organization (ISO) sensitivity is adjusted, the signal strengths of the image signals received from the image sensor 120 need to be increased in the gain control block 131a. In this case, since noise also increases during adjustment of the signal strengths of the image signals, the noise reduction block 132a should be notified that the noise has increased. Accordingly, the image signals and/or the adjusted signal strengths may be transmitted to the noise reduction block 132a through a first control line L2-1, and the noise reduction block 132a may perform a strong filtering.

Also, the auto focus block 131b may be notified of the position of the face of the subject, as recognized by the face detection block 132b, through a second control line L2-2. Accordingly, the auto focus block 131b is able to control focusing, centering around a portion of the recognized face.

Parameters used in the auto exposure control block 131c are transmitted to the digital image stabilizer block 132c through a third control line L2-3. If a shutter speed is reduced by the auto exposure control block 131c, spots may be generated on the image due to hand tremor, for example. Accordingly, when information on the shutter speed is transmitted to the digital image stabilizer block 132c, the degree of the hand tremor correction may be adjusted using the information on the shutter speed.

In addition to the control line L2, which exchanges control data, the data line L1, which transmits image signals, may be provided between the first and second sub blocks 131 and 132, as discussed above. Accordingly, each of function blocks may use information of the corresponding function blocks.

Although not shown in FIG. 2, in various embodiments, the first sub block 131 may further include a shading correction block, an RGB interpolation block, a color space conversion block, a gamma correction block, an auto white balance block, and/or a hue control block.

Also, although not shown in FIG. 2, it would be apparent to one of ordinary skill in the art that any of the function blocks requiring data exchanges with function blocks of the second sub block 132 may be connected to the corresponding function blocks.

Figure 3:
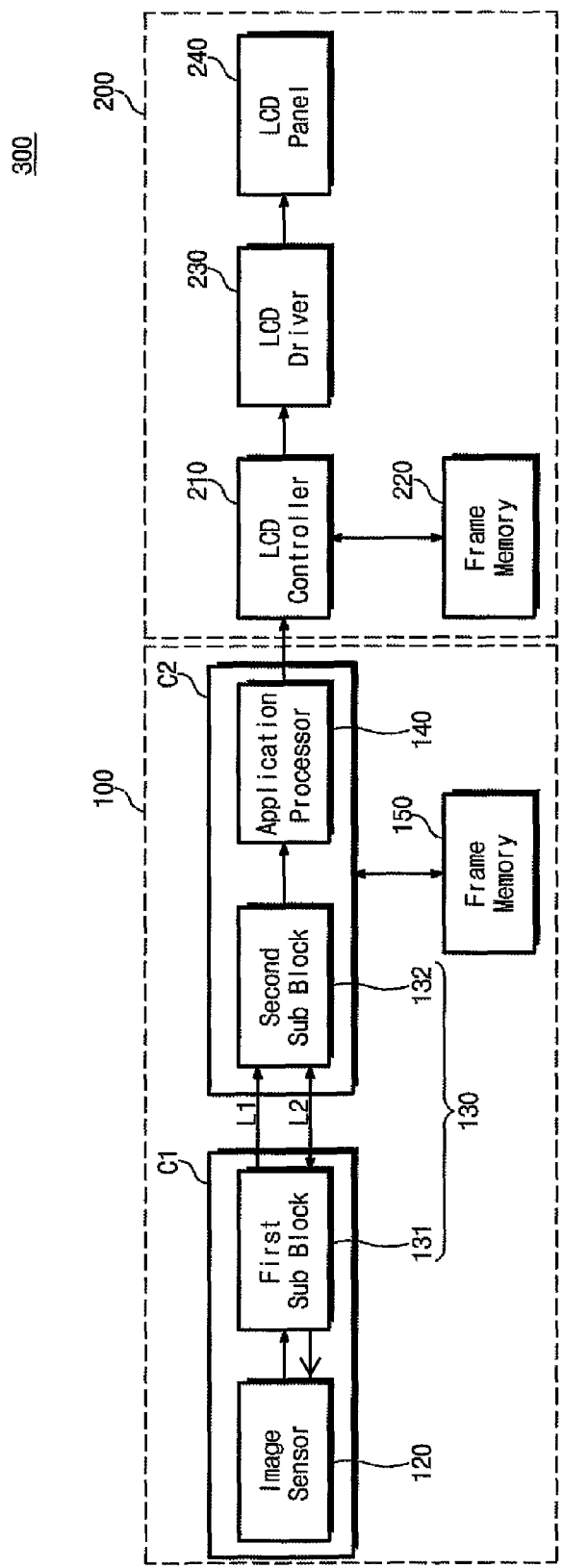
FIG. 3 is a block diagram illustrating a multimedia information appliance, according to an exemplary embodiment of the inventive concept.

FIG. 3 is a block diagram illustrating a multimedia information appliance, according to another exemplary embodiment of the inventive concept.

Referring to FIG. 3, a multimedia information appliance 300 includes a camera unit 100 and an image display unit 200. The configuration of the camera unit 100 is substantially the same as that described with reference to in FIG. 1, and therefore detailed description thereof will not be repeated.

In the depicted embodiment, the image display unit 200 includes an LCD controller 210, a frame memory 220, an LCD driver 230, and an LCD panel 240. The LCD controller 210 is connected to the application processor 140 and/or the frame memory 150 of the camera unit 100 to receive the image signals, and converts a data format of the image signals in accordance with interface specifications with the LCD driver 230. Also, the LCD controller 210 outputs various control signals necessary for an operation of the LCD driver 230.

In the depicted embodiment, the frame memory 220 is connected to the LCD controller 210. Accordingly, the LCD controller 210 may write the image signal in the frame memory 220 and read out the stored image signal from the frame memory 220.

The LCD driver 230 outputs a data signal and a gate signal necessary for the operation of the LCD panel 240 in response to the image signal and the various control signals supplied by the LCD controller 210. Accordingly, the LCD panel 240 may display an image transmitted from the camera unit 100 in response to the data signal and the gate signal. Although not shown, the LCD driver 230 may include a gate driver outputting the gate signal and a data driver for outputting the data signal.

In accordance with embodiments of the camera unit and the multimedia information appliance including the same, an image signal processor may be divided into a first sub block, including function blocks for controlling a lens unit and an image sensor, and a second sub block. A frame memory is connected only to a process chip which includes the second sub block and an application processor, but not to a sensor chip which includes the first sub block and the image sensor. Therefore, the number of components (e.g. memories) of the camera unit is reduced, without affecting performance of the camera unit.

The above-disclosed subject matter is to be considered illustrative and not restrictive, and the appended claims are intended to cover all such modifications, enhancements, and other embodiments, which fall within the true spirit and scope of the inventive concept. While the present inventive concept has been described with reference to exemplary embodiments, it will be apparent to those skilled in the art that various changes and modifications may be made without departing from the spirit and scope of the present teachings. Therefore, it should be understood that the above embodiments are not limiting, but illustrative.

What is claimed is:

1. A camera unit comprising:
   an image sensor receiving an optical signal from a lens unit and converting the optical signal into an electrical signal;
   an image signal processor converting the electrical signal into an image signal, the image signal processor comprising a first sub block controlling the image sensor and the lens unit, and a second sub block receiving the image signal from the first sub block and processing the image signal;
   an application processor receiving the processed image signal from the second sub block and further processing the image signal;
   a frame memory connected to the second sub block and the application processor to store the processed image signal from at least one of the second sub block and the application processor;
   a data line transmitting the image signal output from the first sub block to the second sub block; and
   a control line transmitting processing results of the first sub block to the second sub block, and transmitting processing results of the second sub block to the first sub block, wherein the image sensor and the first sub block are formed in a first chip not connected to the frame memory, and the second sub block and the application processor are formed in a second chip connected to the frame memory.

2. The camera unit of claim 1, wherein the first sub block comprises function blocks that do not use the frame memory, and the second sub block comprises function blocks that use the frame memory.

3. The camera unit of claim 1, wherein the control line comprises a high speed-serial peripheral interface (HS-SPI).

4. The camera unit of claim 1, wherein the first sub block comprises:
   a gain control block adjusting a signal strength of the electrical signal output by the image sensor;
   an auto focus block automatically adjusting a focus of the lens unit; and
   an auto exposure control block controlling an exposure time of the image sensor to adjust automatically a brightness of the image sensor.

5. The camera unit of claim 4, wherein the second sub block comprises:
   a noise reduction block removing noise using one or more frames of the image signal;
   a face detection block recognizing a human face; and
   a digital image stabilizer block inhibiting an effect of hand tremor.

6. The camera unit of claim 5, wherein the electrical signal having the signal strength adjusted by the gain control block is transmitted to the noise reduction block through the control line.

7. The camera unit of claim 5, wherein signals recognizing the human face by the face detection block are transmitted to the auto focus block through the control line.

8. The camera unit of claim 5, wherein parameters used in the auto exposure control block are transmitted to the digital image stabilizer block through the control line.

9. A multimedia information appliance comprising:
   an image sensor receiving an optical signal from a lens unit and converting the optical signal into an electrical signal;
   an image signal processor converting the electrical signal into an image signal, the image signal processor comprising a first sub block controlling the image sensor and the lens unit, and a second sub block receiving the image signal from the first sub block and performing first processing of the image signal;
   an application processor receiving the processed image signal from the second sub block and performing second processing of the processed image signal;
   a frame memory connected to the second sub block and the application processor for storing the processed image signal from at least one of the second sub block and the application processor;
   an image display receiving the processed image signal from the application processor and displaying an image corresponding to the received image signal, wherein the image sensor and the first sub block are formed in a sensor chip not connected to the frame memory, and the second sub block and the application processor are formed in a processor chip connected to the frame memory;
   a data line transmitting the image signal output from the first sub block to the second sub block; and
   a control line transmitting processing results of the first sub block to the second sub block, and transmitting processing results of the second sub block to the first sub block.

* * * * *